United States Patent
Lessing et al.

(10) Patent No.: US 10,179,410 B2
(45) Date of Patent: Jan. 15, 2019

(54) MODULAR ROBOTIC SYSTEMS

(71) Applicant: SOFT ROBOTICS, INC., Cambridge, MA (US)

(72) Inventors: Joshua Aaron Lessing, Cambridge, MA (US); Kevin Alcedo, Coral Springs, FL (US); Ryan Richard Knopf, Melrose, MA (US); Daniel Vincent Harburg, Amsterdam (NL)

(73) Assignee: Soft Robotics, Inc., Bedford, MA (US)

( * ) Notice: Subject to any disclaimer, the term of this patent is extended or adjusted under 35 U.S.C. 154(b) by 0 days.

(21) Appl. No.: 15/180,653

(22) Filed: Jun. 13, 2016

(65) Prior Publication Data
US 2016/0361821 A1    Dec. 15, 2016

Related U.S. Application Data

(60) Provisional application No. 62/174,234, filed on Jun. 11, 2015.

(51) Int. Cl.
*B25J 15/00* (2006.01)
*B25J 15/10* (2006.01)

(52) U.S. Cl.
CPC ....... *B25J 15/0023* (2013.01); *B25J 15/0061* (2013.01); *B25J 15/10* (2013.01)

(58) Field of Classification Search
CPC .. B25J 15/009; B25J 15/0033; B25J 15/0028; B25J 15/08; B25J 15/12; B25J 15/0023; B25J 15/0061; B25J 15/10; A01D 46/00; A01D 46/005; A01D 46/10; A01D 91/00; Y10S 56/08
See application file for complete search history.

(56) References Cited

U.S. PATENT DOCUMENTS

| | | | | |
|---|---|---|---|---|
| 3,343,864 A | * | 9/1967 | Baer | B25J 15/0009 294/119.3 |
| 4,202,158 A | * | 5/1980 | Edwards | A01D 46/264 56/328.1 |
| 4,842,473 A | * | 6/1989 | Zbornik | B21D 43/105 294/188 |

(Continued)

FOREIGN PATENT DOCUMENTS

| | | |
|---|---|---|
| WO | 2006037951 A1 | 4/2006 |
| WO | 2014138123 A1 | 9/2014 |

OTHER PUBLICATIONS

International Search Report and Written Opinion of PCT/US16/037197; dated Nov. 7, 2016; 9 pages.

*Primary Examiner* — Stephen A Vu

(57) ABSTRACT

Exemplary embodiments provide modular robotic systems that allow one or more operation parameters of a robotic actuator, or group of actuators, to be dynamically configured or reconfigured. The operation parameters may be, for example, the X, Y, and/or Z position of the actuator or group of actuators with respect to other actuators, the arrangement of the actuator(s) into an array or matrix, the rotation or pitch of an actuator, the distance between actuators, the grip strength or grip surface of an actuator, etc. Accordingly, the same robotic manipulator(s) may be used for multiple purposes in multiple different contexts, manipulators can be swapped out on-the-fly, and robotic systems may be dynamically reconfigured to perform new tasks.

11 Claims, 20 Drawing Sheets

(56) References Cited

U.S. PATENT DOCUMENTS

| | | | | |
|---|---|---|---|---|
| 4,968,077 | A * | 11/1990 | Redmon, Jr. | B25B 5/06 |
| | | | | 294/119.1 |
| 6,718,766 | B2 * | 4/2004 | Seto | B25J 9/142 |
| | | | | 60/476 |
| 7,258,379 | B2 * | 8/2007 | Ono | B25J 9/142 |
| | | | | 294/119.3 |
| 8,585,111 | B2 * | 11/2013 | Nammoto | B25J 15/10 |
| | | | | 294/106 |
| 9,079,314 | B2 * | 7/2015 | Kitamura | B25J 15/0038 |
| 9,272,422 | B2 * | 3/2016 | Matsuoka | B25J 15/08 |
| 2005/0120820 | A1 | 6/2005 | Takenaka et al. | |
| 2005/0218679 | A1 | 10/2005 | Yokoyama et al. | |
| 2009/0194922 | A1 | 8/2009 | Lin et al. | |

* cited by examiner

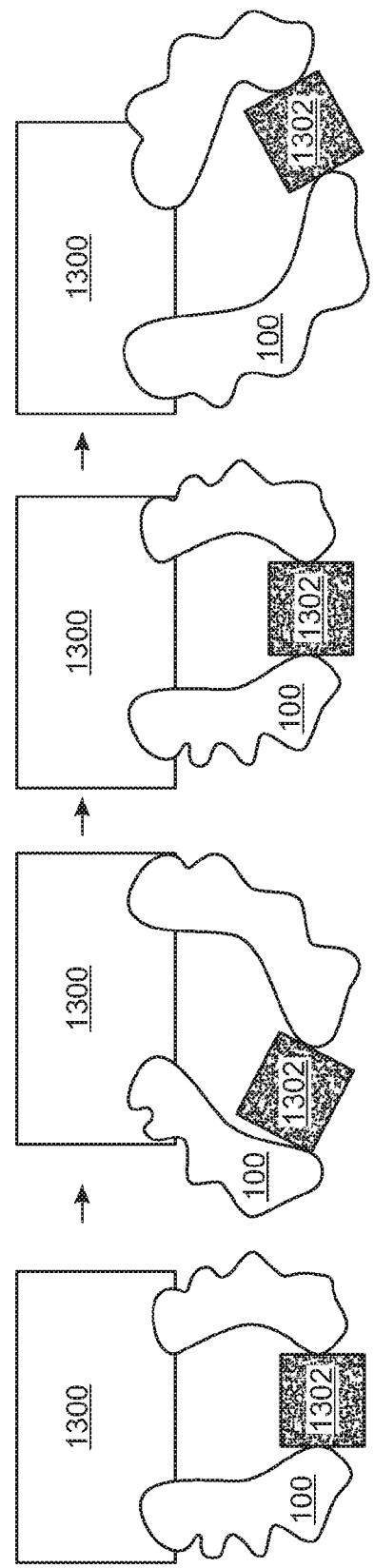

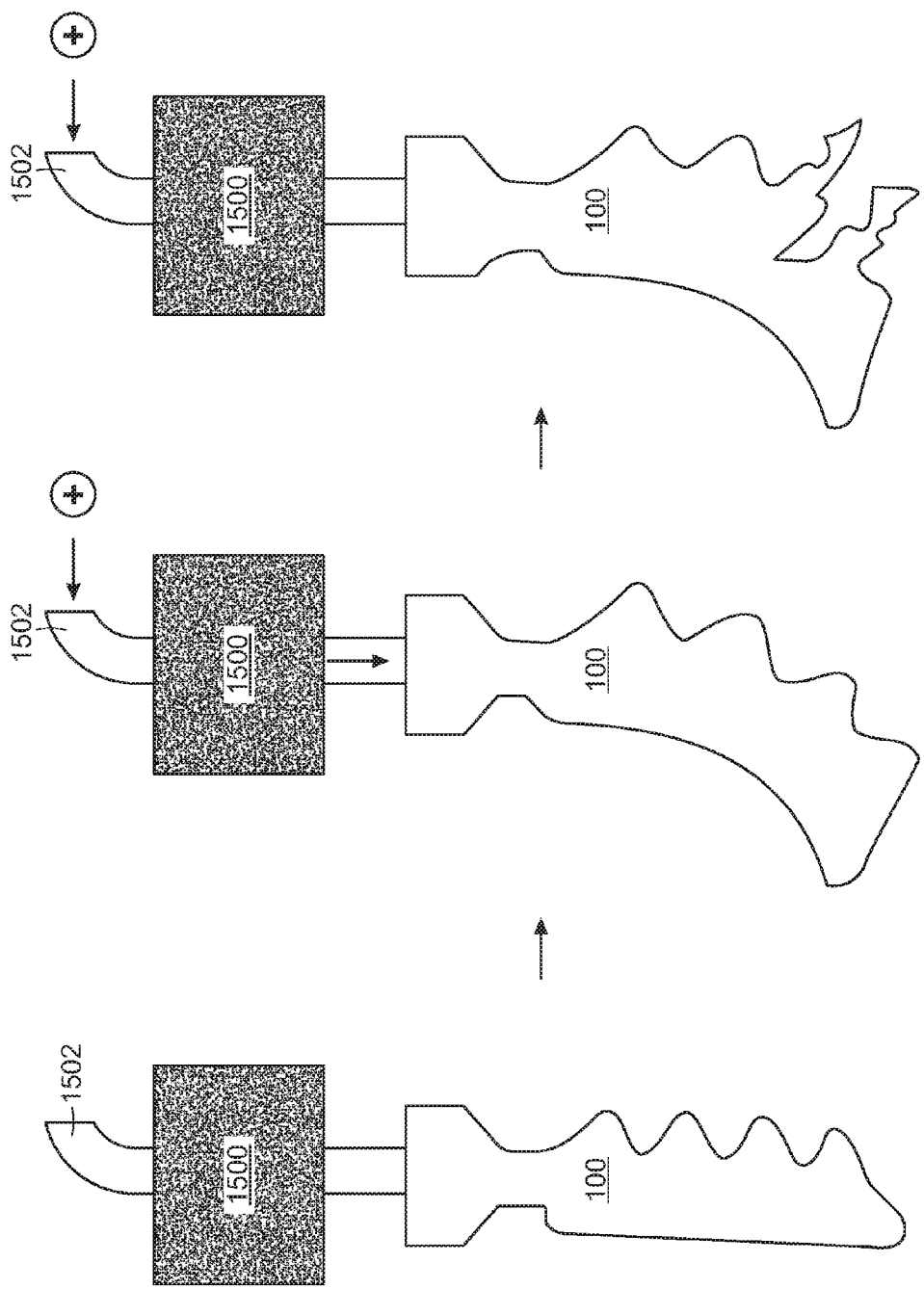

MODULAR ROBOTIC SYSTEMS

RELATED APPLICATIONS

This application claims priority to U.S. Provisional Patent Application Ser. No. 62/174,234, filed on Jun. 11, 2015 and entitled "Modular Robotic Systems." The contents of the aforementioned application are incorporated herein by reference.

BACKGROUND

Robotic systems are employed in a number of different contexts, and may be called upon to perform a wide variety of different tasks. Robots typically manipulate objects around them using robotic manipulators such as individual actuators, grippers, or end effectors.

Conventionally, robots may be deployed with a particular type of manipulator that is fixed. Accordingly, in a different context, the robot may be swapped out for a different robot with a different type of manipulator. Alternatively, the robot's manipulator may be interchangeable with other types of manipulators. However, swapping robotic manipulators can be a time consuming, complex, expensive, and non-intuitive process.

Still further, a robot may have the appropriate type of manipulator for a task, but the manipulator may be set up in a sub-optimal (or even non-useful) way. For example, a robot may use the same type of manipulator to pick up tennis balls and soccer balls, but a manipulator sized and configured to pick up a tennis ball may be an ill fit for picking up a soccer ball.

Manipulators may also be deployed in groups. For example, an industrial assembly line may be operated by a robot having several manipulators connected in series, so that the robot can perform tasks with respect to multiple parts at the same time. However, such groups of manipulators are often deployed in a predetermined configuration that is difficult to change on-the-fly. If the context in which the manipulators are employed changes, the manipulators may need to be manually reconfigured. Custom adjustable grippers may also be expensive and may require substantial engineering time to develop.

In some cases, manipulators can wear out and need to be replaced. This is also typically a manual process, which involves removing the old manipulator and replacing it with a new one. If the broken manipulator is a part of a group of manipulators, the entire group may be taken out of operation when one manipulator breaks.

SUMMARY

The present application addresses these and other problems associated with robotic systems. According to exemplary embodiments, modular robotic systems are described. The modular robotic systems allow some aspect of the robotic manipulator, or groups of manipulators, to be modified in a simple and dynamic fashion. Accordingly, the same robotic manipulator(s) may be used for multiple purposes in multiple different contexts, manipulators can be swapped out on-the-fly, and robotic systems may be dynamically reconfigured to perform new tasks.

BRIEF DESCRIPTION OF THE FIGURES

FIGS. 4A-4C depict an example of a modular array of actuators, according to exemplary embodiments.

FIGS. 13A-13K depict examples of adaptable reinforcements for object gripping and oscillation reduction according to exemplary embodiments.

FIG. 15A-15C depicts an example of a system for automatic actuator pop detection and shut-off, according to an exemplary embodiment.

DETAILED DESCRIPTION

Figure 1A:
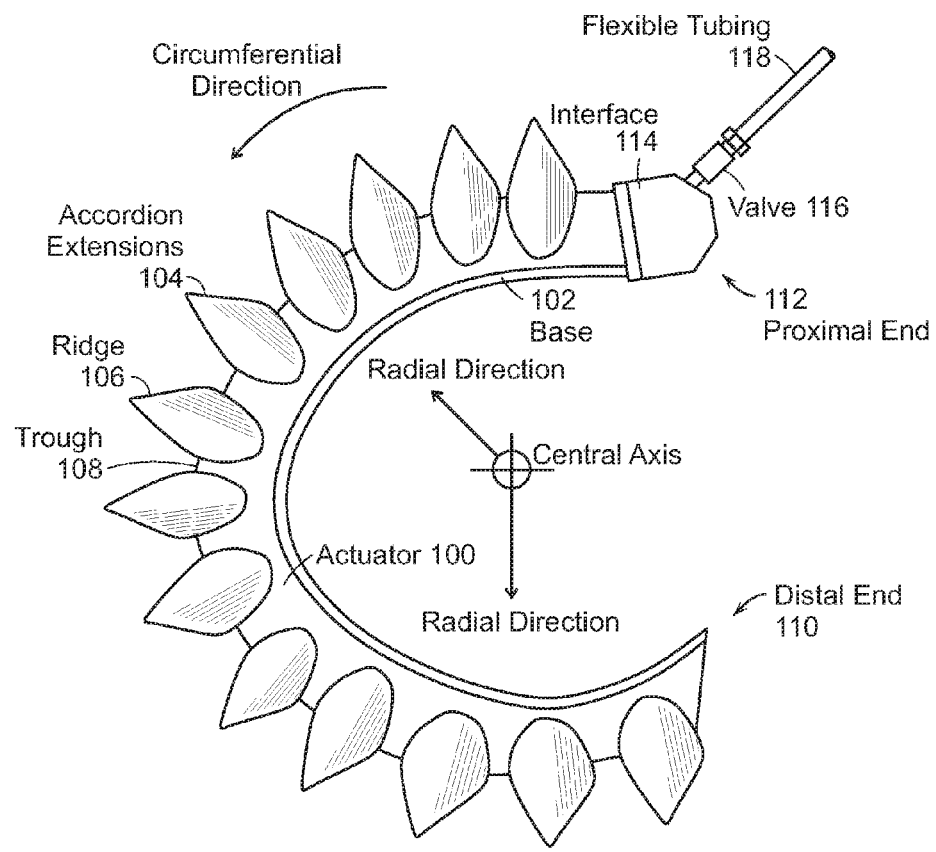
FIGS. 1A-1D depict exemplary soft robotic actuators suitable for use with exemplary embodiments described herein.

Exemplary embodiments relate to modular robotic systems in which various parameters of the system can be adjusted dynamically to reconfigure the system. More specifically, Exemplary embodiments provide modular robotic manipulators that can be dynamically reconfigured to operate in different contexts and with different grasp targets. As used herein, modularity refers to the ability to change one or more operating parameters of a robotic actuator, manipulator, end effector, or gripper (the terms "manipulators," "actuators," "end effectors," and "grippers" are generally used interchangeably herein). Such operating parameters include, but are not limited to, the absolute position of the actuator in a Cartesian plane or three-dimensional space, the orientation of the actuator ($\phi,\theta,\psi$), the position of the actuator relative to other actuators in the X, Y, and/or Z plane, the pitch of the actuator relative to its base, the rotation angle of the actuator, the degree of flexion or curvature of an actuator, and the arrangement or configuration of actuators in an array or matrix, among other possibilities.

Exemplary embodiments may be advantageously employed in conjunction with soft robotic actuators. Soft robotic actuators are relatively non-rigid actuators that may be actuated, for example, by filling the actuator with a fluid such as air or water. The soft actuator may be configured so that, by varying the pressure of the fluid in the actuator, the shape of the actuator changes. Accordingly, the actuator can be made to, for instance, wrap around an object. Because the soft actuator is relatively non-rigid, the actuator may better conform to the surface of the grasped object, allowing the actuator to gain a better hold on the object or more gently hold fragile objects. Thus, soft actuators can be employed in a wide variety of applications as compared to rigid actuators, which makes the exemplary modular systems particularly well-suited to use with soft actuators.

A brief overview of soft robotic actuators and grippers will first be provided, followed by a detailed description of various aspects of exemplary embodiments. Unless otherwise noted, it is contemplated that each of the described embodiments may be used in any combination with each other (e.g., allowing for translation and rotation of an actuator, mounting modular arrays of grippers on rails, etc.).

Background on Soft Robotic Grippers

Conventional robotic grippers or actuators may be expensive and incapable of operating in certain environments where the uncertainty and variety in the weight, compliance, size, and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
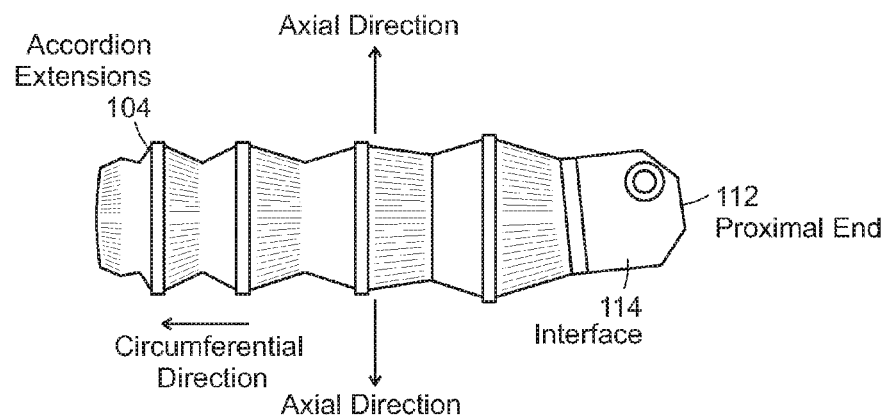
Figure 1C:
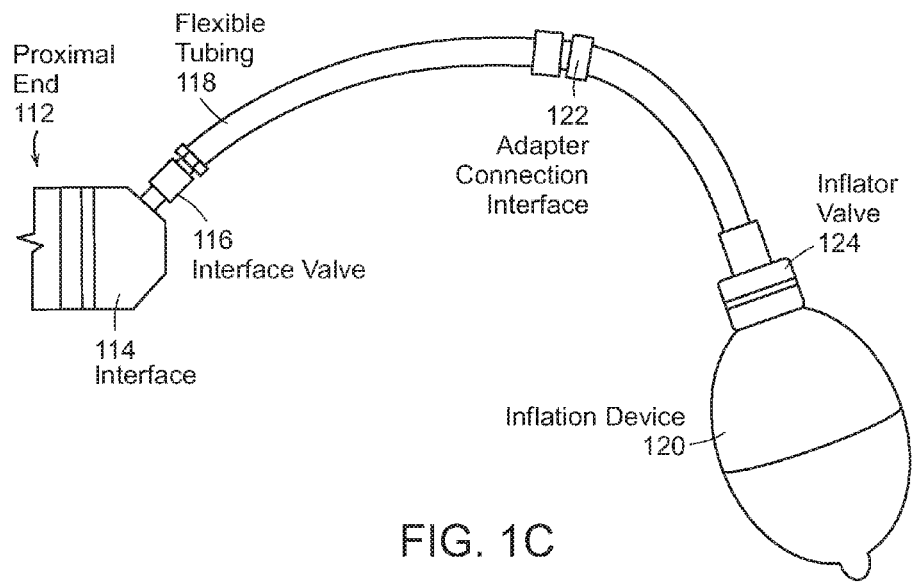
Figure 1D:
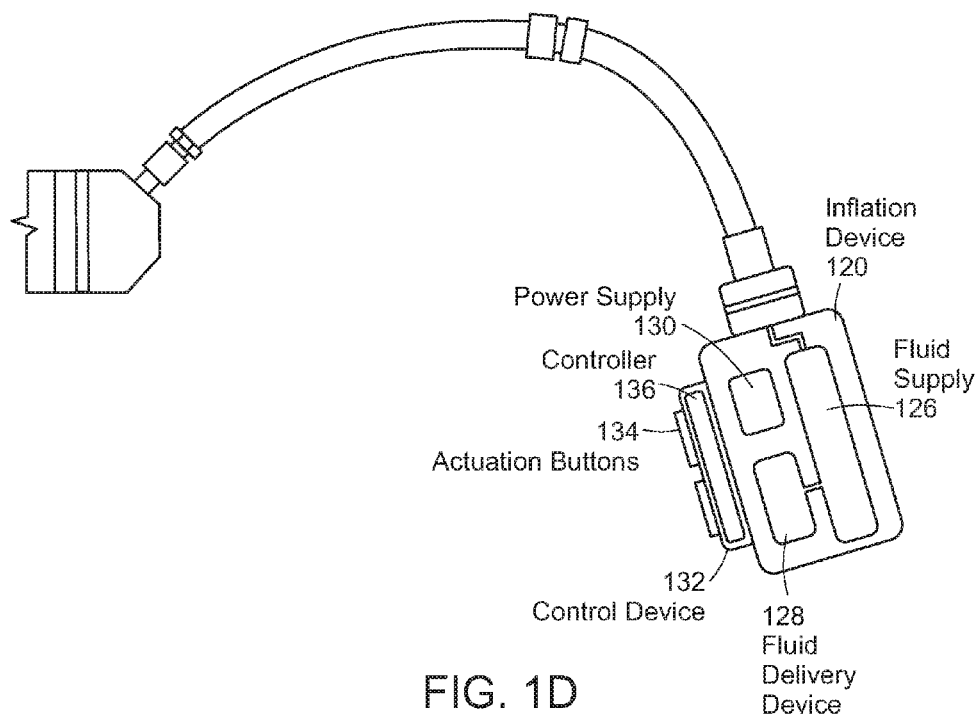

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the incision retractor. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Actuators/Grippers having an Adjustable Position

Exemplary embodiments depicted in FIGS. 2A-4C depict examples in which actuators are reconfigured by repositioning the actuators with respect to each other using rails. Although rails (and, more specifically, T-slot rails) are used in the embodiments depicted in these Figures, the present invention is not limited to repositioning actuators using any particular type of guidance mechanism. In addition to T-slots, other types of rail-based systems maybe employed, such as a system using a circular metal collar deployed in conjunction with the actuator and fixed in position on a rod via a set-screw. Moreover, non-rail-based systems may also be employed; examples of non-rail based systems are described herein and will also be apparent to one of ordinary skill in the art.

Figures 2A, 2B:
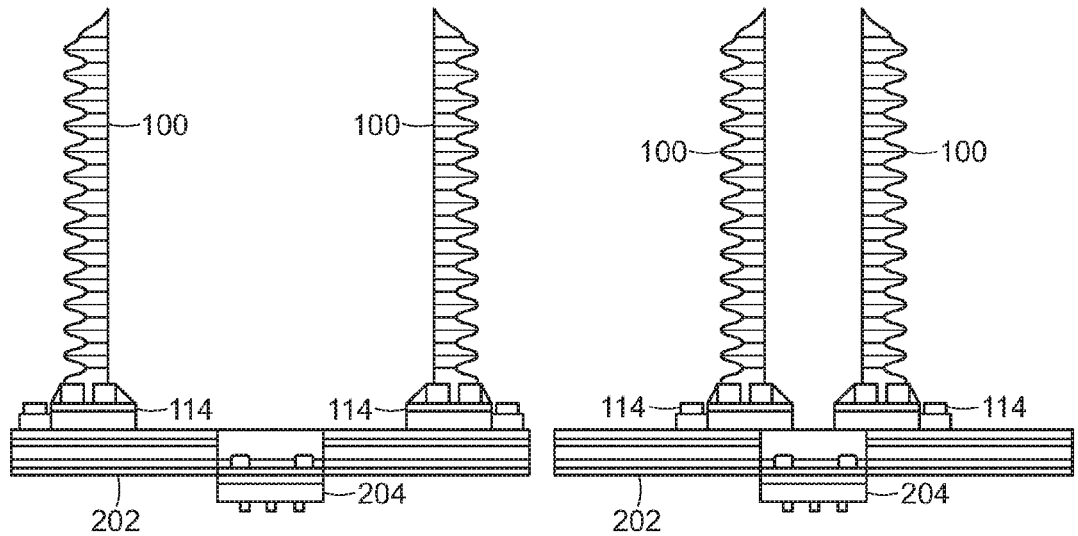
FIGS. 2A-2C depict examples of systems for adjusting the position of robotic actuators using a rail, according to an exemplary embodiment.
Figure 2C:
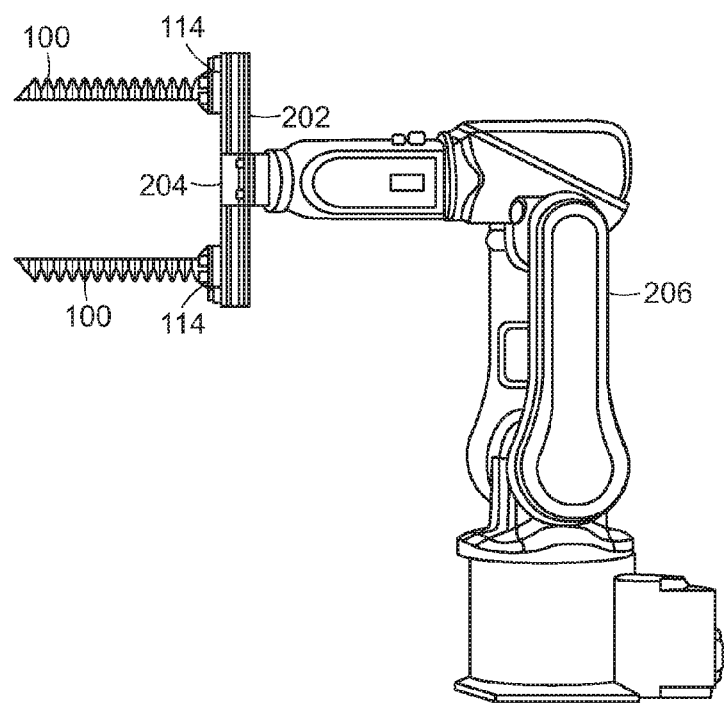

As shown in FIGS. 2A-2C, soft actuators 100 can be mounted to a rail system 202 employing T-slot extrusion so that the position of individual actuators can be rapidly adjusted. FIG. 2A depicts a side-view of a system in which two actuators 100 mounted to a rail system 202 collectively form a robotic gripper or end effector. In this example, the actuators 100 are held to a length of the rail system using an interface 114 (in this case, a plastic clip at the bottom of the actuator 100) employing bolts. FIG. 2B depicts a side view of the same system after the actuators 100 have been slid along the rails 202 to decrease the distance between the actuators 100. For example, the bolts of the interface 114 may be loosened to allow the actuators 100 to slide along the rail 202. This adjustability allows for the rapid reconfiguration of the end-effector in order to allow for the manipulation of objects of vastly different size with the same device. Note the interfaces 114 shown here also provide a sealed pneumatic inlet for pressurizing and depressurizing the soft actuators (the pneumatic routing is not shown).

This end-effector can be attached, for example, to a robotic arm 206 via a mounting flange 204 on the rail 202 in order to enable the arm to pick and place objects of interest (FIG. 2C). The mounting flange 204 on the rail 202 may be configured to mate with a corresponding flange on the robotic arm 206 to secure the end effector system to the robotic arm 206. A pneumatic passage may be provided through the mounting flange 204 to allow an inflation fluid to pass from the robotic arm 206 through the mounting flange 204, through the rail 202 and into the actuators 100.

It should be noted that this style of adjustable gripper is not limited to the use of T-slot extrusion. One of ordinary skill in the art will recognize that any suitable modular rail mounting system may provide similar functionality.

Although FIG. 2C depicts a particular example in which an end effector is deployed on a robotic arm 206, the present invention is not limited to this application. For example, in some embodiments the actuator 100 may be deployed on a gantry or other mechanism.

It is also noted that, although FIGS. 2A-2C depicts individual actuators 100 that are relocatable, the same principle may be applied to groups of actuators 100 moving with respect to each other. For example, the individual actuators of FIGS. 2A-2C could be replaced with groups of actuators 100 forming gripping mechanisms.

The movement of the actuators 100 along the rail 202 (or other guidance mechanism) may be achieved manually (e.g., using adjustable components that are moved by an operator) or automatically (e.g., using a motor, pneumatic feed, or another device suitable for effecting movement of the actuators 100).

The actuators 100 or grippers in this array may be driven in that the position of an actuator 100 or a gripper can be changed via the action of a machine. For example, the actuators 100 may be driven via a motor that drives a screw or belt that is attached to the actuators 100, or by a pneumatically-actuated piston that is attached to the soft actuator 100 or gripper.

Figure 3A:
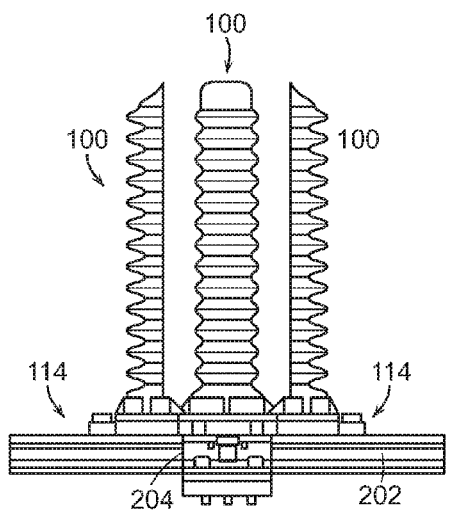
FIGS. 3A-3D depict further examples of systems for adjusting the position of robotic actuators using a plurality of rails, according to an exemplary embodiment.
Figure 3B:
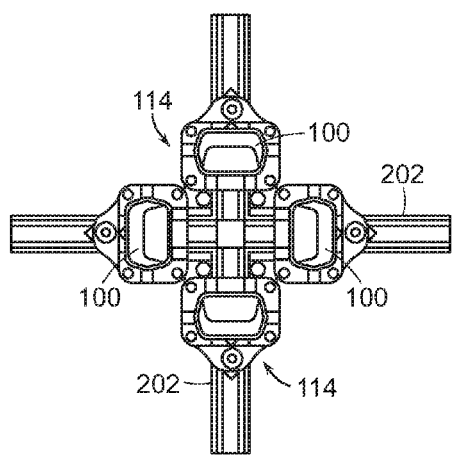

T-slot extrusion can be used to create grippers whose actuators can be reconfigured in one dimension (as shown in FIGS. 2A-2C), in two dimensions, and in three dimensions. For instance, FIG. 3A depicts a side view of four soft actuators 100 mounted to T-slot extrusions 202 in an "X" pattern, where the actuators 100 are set to a close configuration. FIG. 3B depicts a top view of the grippers shown in FIG. 3A.

Figure 3C:
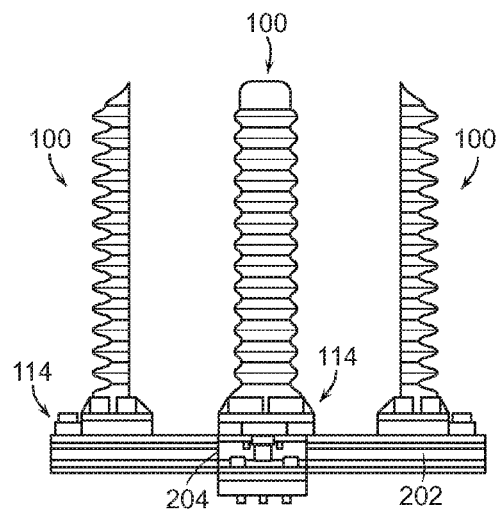
Figure 3D:
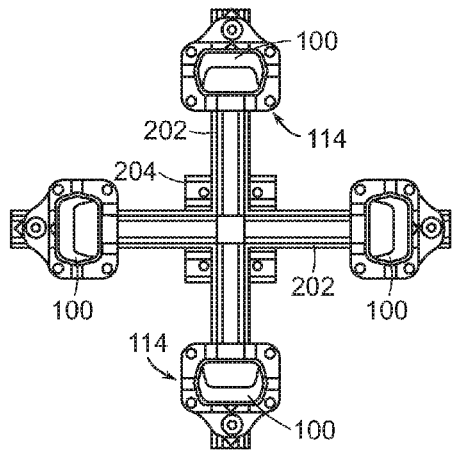

In FIGS. 3C (side view) and 3D (top view), the actuators 100 of FIGS. 3A-3B have been reconfigured to be spaced further apart. As will be apparent to one of ordinary skill in the art, the available actuator configurations may be changed by modifying the configuration of the rails 202 on which the actuators 100 are mounted.

Figure 4A:
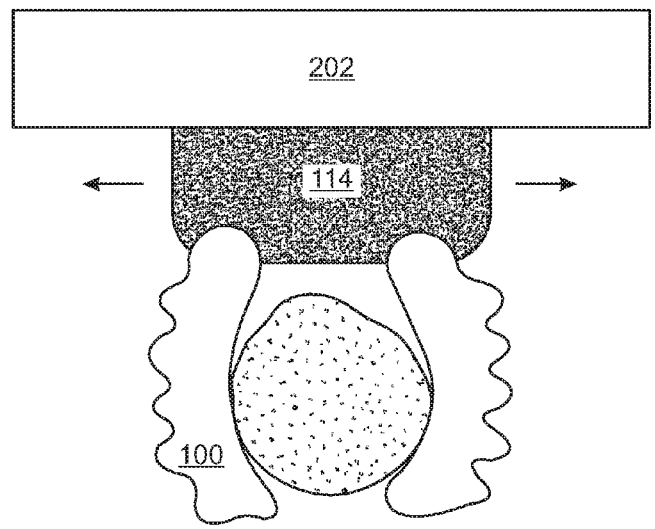
Figure 4B:
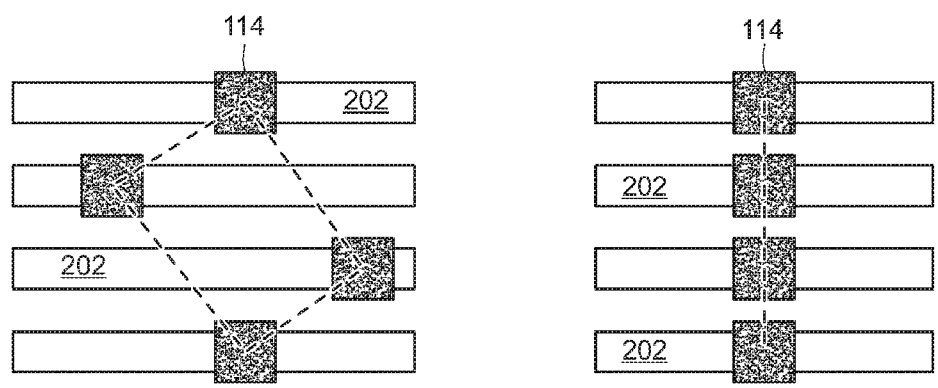

Multiple actuators 100 may be arranged in a modular array and reconfigured with respect to each other for different purposes, as shown for example in FIGS. 4A-4C. FIG. 4A depicts an exemplary gripper including two actuators 100 mounted to an interface 114 that is laterally translatable along a rail system 202. A plurality of such grippers (or individual actuators 100 in place of the gripper) may be deployed together in order to form different dynamic configurations by changing the position of each gripper on the rail 202.

FIGS. 4B-4C demonstrates the ability of actuators or grippers on actuated rails 202 to change their relative position in order to conform to task specific configurations. This array could be mounted on a robotic platform which allows the array to change its orientation relative to an object to be gripped, or to allow actuators 100 or groups of actuators to be rearranged into different array configurations. For example, a set of four actuators may be deployed in a 2×2 arrangement (FIG. 4B), and then dynamically reconfigured into a 1×4 arrangement (FIG. 4C). One example of a situation in which such a capability might be useful is in the context of an intermediate warehouse in which goods are received from a bulk distributor and repackaged for shipment to a point of sale or to consumers. The bulk distributor might, for example, provide cases of products arranged into a 4×3 matrix, and the products might be repackaged into smaller 2×2 cases. Using the arrangements shown in FIGS. 4B and 4C, the grippers might initially be arranged into a 1×4 arrangement to retrieve the products from the bulk distributor's cases, and then could dynamically reconfigure themselves into a 2×2 arrangement to place the products into the smaller 2×2 cases.

Furthermore, the platform may be dynamically reconfigured to optimize its grip configuration depending on the target to be grasped. For instance, if the grippers are intended to grasp flat objects such as books, then pairs of actuators 100 may be deployed parallel to, and facing, each other (in a configuration similar to that depicted in FIG. 7C). If the grippers then need to grasp a ball, then four actuators 100 may be rearranged into a square configuration facing towards their common center, in order to more effectively grasp the new object (in a configuration similar to that depicted in FIG. 7D).

In another example, the grippers may maintain the same overall shape, but may change the dimensions of the shape. For instance, the grippers may initially deposit baked goods on a tray, and may then retrieve the baked goods and reconfigure themselves into a more compact formation for packaging. Typically, baked goods must be spread apart on the tray by a reasonable amount, to allow for expansion when baking. However, when the baked goods are packaged for shipping, it is helpful to decrease the amount of space between the goods in order to reduce shipping size and allow more goods to fit into a container. By dynamically reconfiguring the gripper configuration to reduce the amount of space between the grippers, the goods can be retrieved from a baking sheet and then packaged for delivery using a single robotic system.

Actuator Substrates

FIGS. 5A-7F depict examples of actuators mounted to substrates.

As shown in FIGS. 5A-5D, soft actuators can be rapidly rearranged to form new grippers by utilizing a mounting plate with a periodic array of holes. Alternatively or in addition, the mounting plate may include arrays of slots, so that an actuator 100 may be inserted into the slot track and secured to the mounting plate.

Figure 5A:
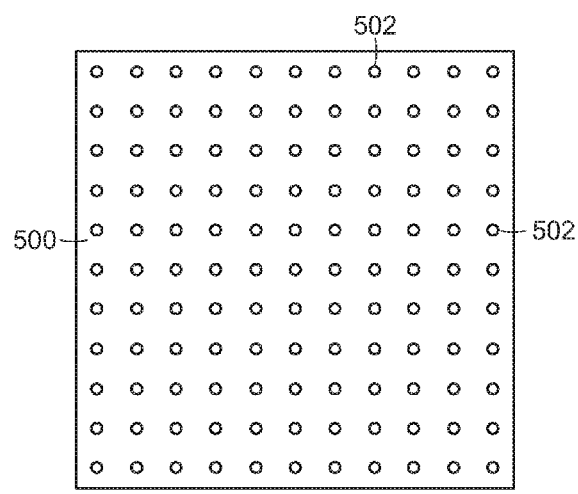
FIGS. 5A-5D depict examples of mounting modular robotic grippers to a mounting plate containing a periodic hole array, according to an exemplary embodiment.

FIG. 5A depicts a substrate in the form of a plate 500 with a periodic array of holes 502 configured to mount soft actuators, as well as to hold a flange used for attaching the resulting gripper to a robotic arm (not shown). In some embodiments, the holes 502 may also form paths for providing inflation fluid to the actuators through the bases or interfaces of the actuators.

Figure 5B:
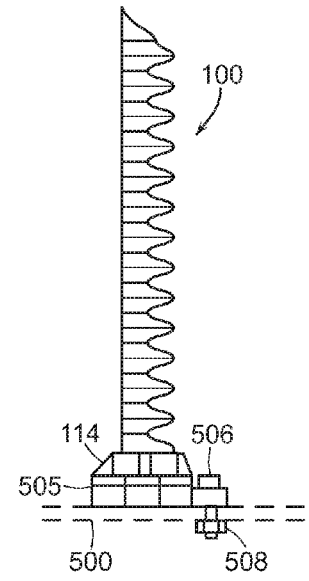

FIG. 5B depicts a soft actuator 100 mounted at its interface 114 in a holder 504 that is used to fixture the actuator 100 to the mounting plate 500 as well as provide the sealed pneumatic inlet for actuating the soft actuator 100. Here, a nut 508 and bolt 506 is used to secure the actuator holder 504 to the mounting plate 500, although one of ordinary skill in the art will recognize that other means of fastening the actuator holder 504 to the mounting plate 500 may also be employed. In some embodiments, the actuator holder 504 may be omitted entirely and the actuator 100 may be secured directly to the mounting plate 500 via the interface 114.

Figure 5C:
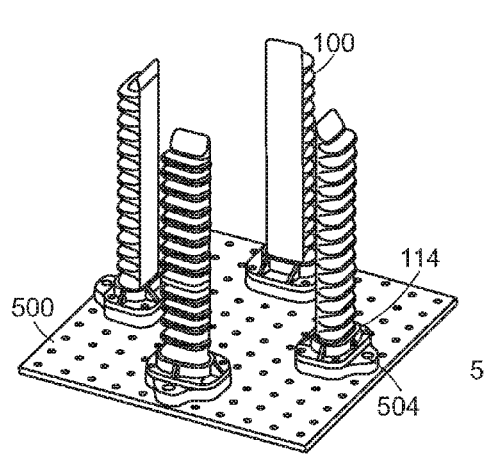
Figure 5D:
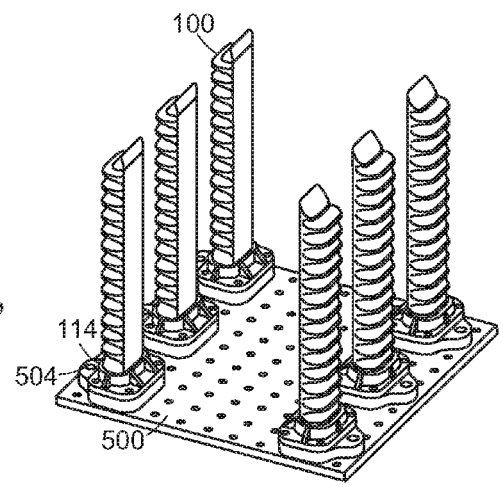

FIG. 5C depicts one possible configuration of soft actuators 100 in which two sets of opposing actuators 100 are mounted perpendicularly to one another. This configuration may be useful for manipulating semi-spherical objects like apples. Shown in FIG. 5D is another possible configuration of soft actuators 100 in which three sets of opposing actuators 100 are mounted parallel to one another. This configuration may be useful for manipulating rectangular prism-shaped objects such as books.

Another way to rapidly reconfigure an end-effector, as depicted in FIGS. 6A-6D, is to use magnets to quickly attached soft actuators to holes on a mounting plate that supply pressurizing fluid.

Figure 6A:
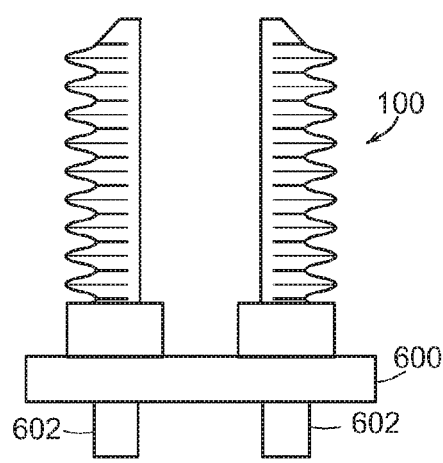
FIGS. 6A-6D depict examples of soft actuators having overmolded magnets provided in a quick-connect flange, according to an exemplary embodiment.
Figure 6B:
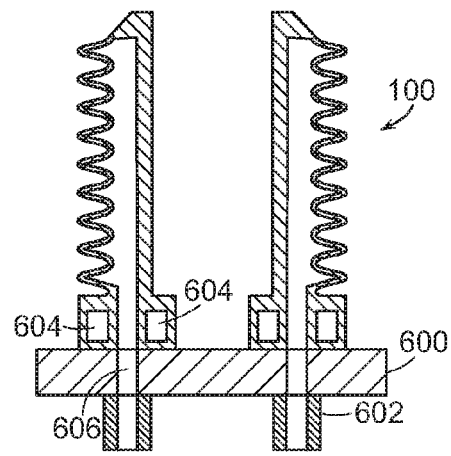

FIG. 6A depicts two soft actuators 100 mounted on a ferromagnetic mounting plate 600 beneath which are pneumatic supply lines 602. FIG. 6B depicts a cross-section view of the assembly shown in FIG. 6A. As shown in FIG. 6B, annular magnets 604 are overmolded into the base of the actuators 100, the annular magnets 604 being used to hold the actuators 100 to the mounting plate 600. These magnets 604 also seal the interface between the actuator 100 and the mounting plate 600 so that pressurizing fluid can be deliver to the actuators via pneumatic supply holes 606 in the mounting plate 600 that are connected to the pneumatic lines 602.

Figure 6C:
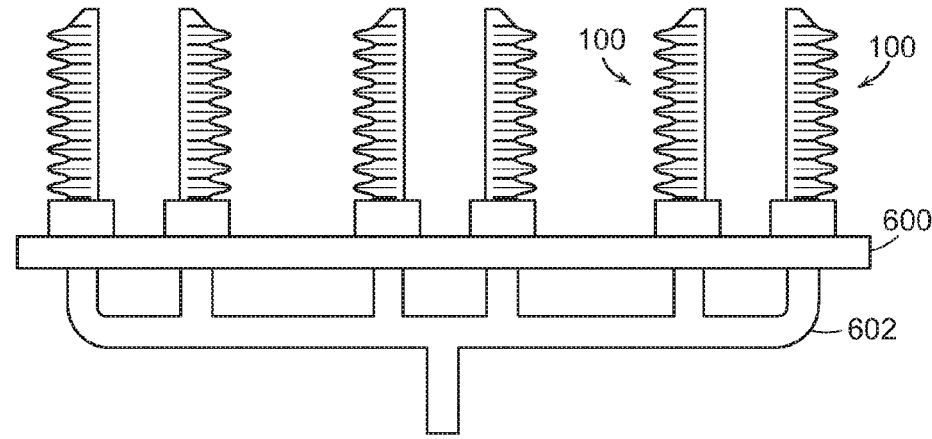
Figure 6D:
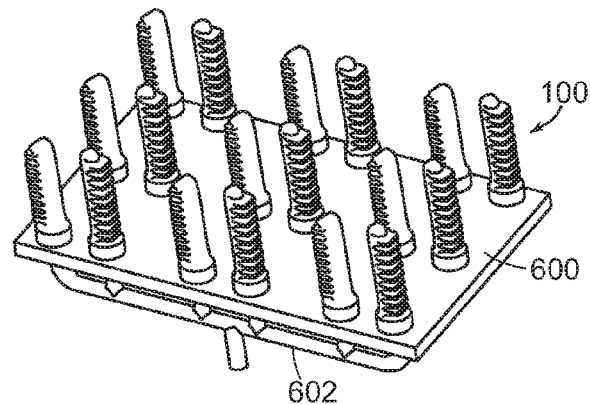

FIG. 6C depicts a side view, and FIG. 6D depicts a perspective view, of one possible configuration of magnetically-attached actuators forming a modular end effector. In some embodiments, an overmolded magnetic plate may be used to cap individual pneumatic supply holes 606 allowing for the rapid removal of gripping regions from the end-effector.

Although not shown in FIGS. 6A-6D, the magnets may be deployed in the substrate instead of the actuator. Alternatively, the magnets may be deployed in both the substrate and the actuator in a manner that allows a designer to limit the configurations in which the actuators can be positioned. For example, by deploying magnets of opposing polarities in corresponding locations on the actuator and the substrate, the actuators can be placed on the substrate in a preferred position in which corresponding magnets align, but cannot be placed in a non-preferred position in which opposing magnets align. This feature may be combined with physical interlocking mechanisms (e.g., pegs and cutouts) that restrict the way that the actuators can be deployed.

Although some of the described embodiments refer to pneumatic actuation, it is noted that other forms of actuation, including hydraulic and vacuum actuation, are also possible.

Figure 7A:
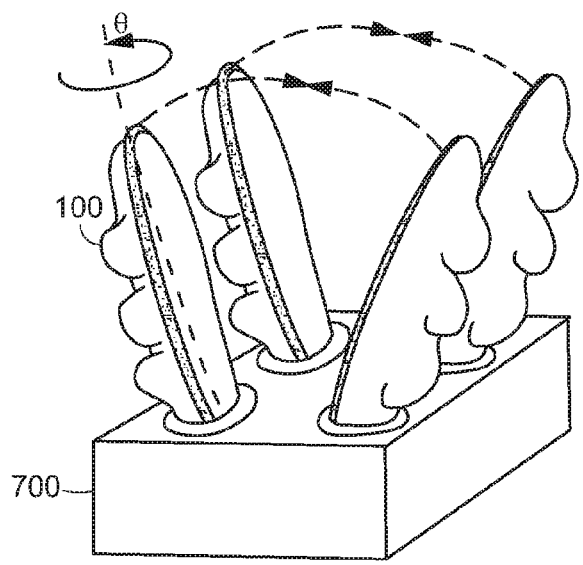
FIGS. 7A-7F depict examples of systems for adaptable finger rotation, according to exemplary embodiments.
Figure 7B:
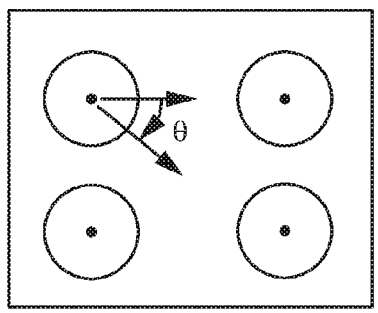
Figure 7C:
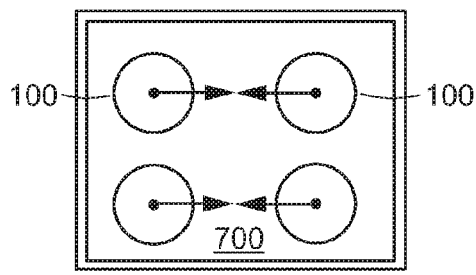
Figure 7D:
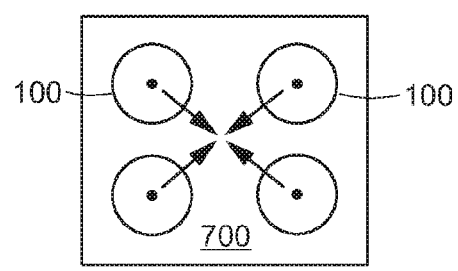

FIGS. 7A-7D depict examples of robotic actuators 100 mounted on a substrate 700 in which individual actuators 100 have the ability to change orientation (e.g., by changing the angle θ, as shown in FIG. 7B), for task-specific gripping. In FIG. 7C, pairs of actuators 100 rotate to face each to form a gripping configuration useful, for example, for picking a book. In FIG. 7D, each of the four actuators 100 rotate to face a central area of the substrate 700 to form a gripping configuration useful, for example, for picking up sphere-like objects.

Figure 7E:
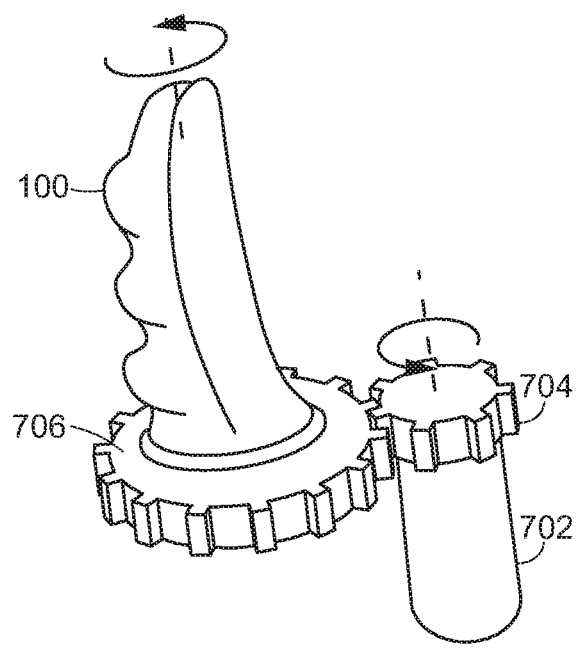
Figure 7F:
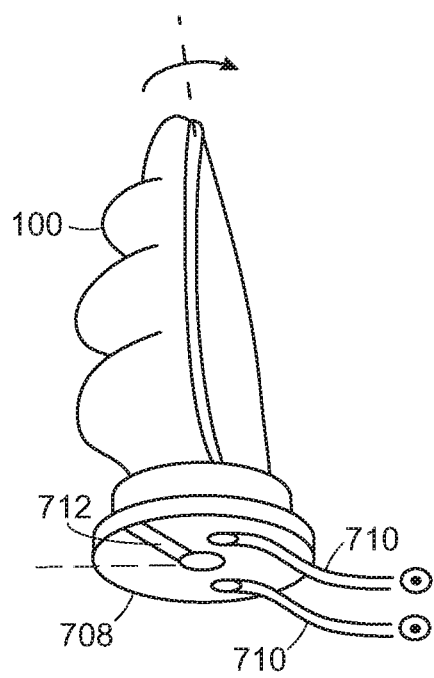

FIGS. 7E and 7F demonstrate two exemplary techniques to provide such rotations.

FIG. 7E depicts an actuator 100 which is rotated through a geared motor 702. Such a motor 702 may provide precise angle control through the use of encoder sensors. A gear 704 of the motor 702 contacts a gear 706 attached to the actuator 100, rotating the actuator when the motor 702 is activated.

FIG. 7F depicts an actuator 100 rotated through a rotary pneumatic actuator 708. Such an actuator 708 functions by filling each side of a line 710 with air. Depending on an amount of air on each side of the line 710, an angle of a lever 712 connected to the actuator 708 may be altered.

Although FIGS. 7A-7D have been shown with actuators mounted on a substrate such as the mounting plates of FIGS. 5A-6D, one of ordinary skill in the art will recognize that the actuator rotation mechanisms depicted in FIGS. 7A-7F may also be deployed in other contexts, such as the rail system of FIGS. 2A-4C. Moreover, the rotation mechanism may be used to rotate entire grippers comprising multiple actuators, rather than individual actuators.

Moreover, mechanisms similar in functionality to the rotation mechanism of FIGS. 7E-7F may also be used to adjust the pitch of the actuator relative to the substrate, allowing (for example) individual actuators to "lean" in and out on the substrate.

Modular Arrays of Grippers

In some exemplary embodiments, modular arrays of grippers and/or actuators are provided by mounting grippers 800 to tiles 802 capable of mechanically interlocking with other tiles 802, as shown in FIGS. 8A-8E.

Figure 8A:
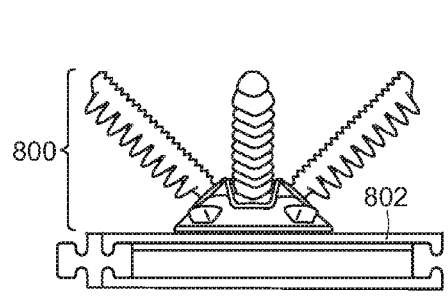
FIGS. 8A-8E depict examples of modular interlocking gripper arrays, according to an exemplary embodiment.
Figure 8B:
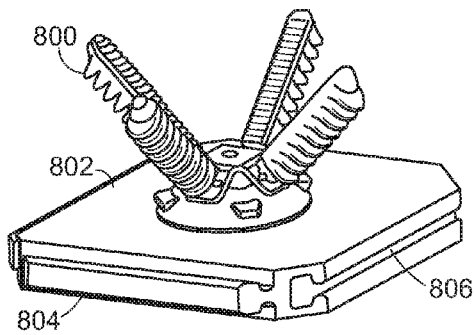

FIG. 8A depicts a side view of a gripper/tile unit, and FIG. 8B depicts a perspective view of the unit. Each unit may be combined with other units to form a modular system. The tile 802 may contain interlocking features, such as a peg 804 and a receptacle 806 configured to mate with the peg 804, the tile with other tiles to form an array. In this embodiment the mechanical interlocking peg 804 and receptacle 806 are in the form of a dovetail, although though other interlocking feature geometries may also be utilized.

Figure 8C:
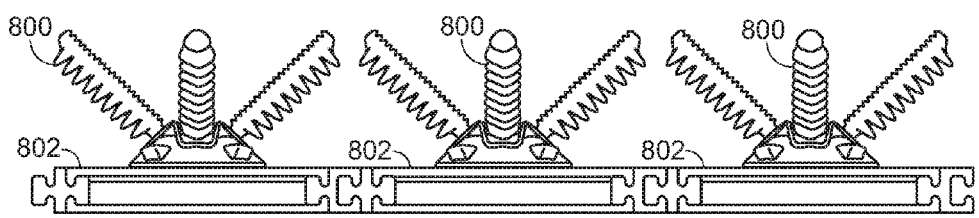
Figure 8D:
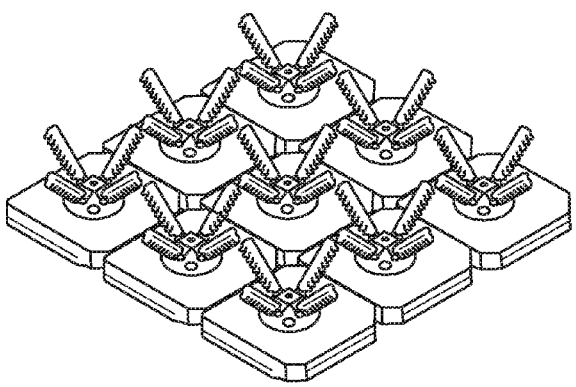

FIG. 8C is a side-view showing a linear array of grippers formed by interlocking the dovetail features of neighboring tiles. FIG. 8D depicts one possible two-dimensional gripper array that can be made using this tile assembly concept.

Figure 8E:
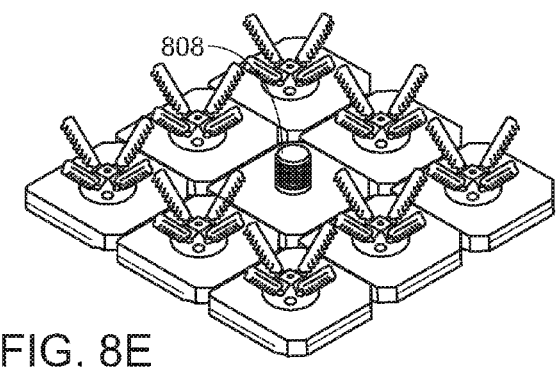

FIG. 8E is a gripper array similar to that depicted in FIG. 8D, where one of the tiles contains a sensor (in this case a camera 808) instead of a gripper. In use, the sensor may allow for the gripper array to be precisely positioned so that each gripper may be positioned over a target object to be grasped. The sensor may also allow for identification of target objects, distance identification, etc. Some examples of suitable sensors for automation applications would include, QR code readers, bar code scanners, RFID tag readers, laser range finders, and acoustic range finders.

Each actuator or group of actuators in a tile may be provided with independent valve controls so that the flow of a fluid to the actuator(s) can be individually controlled (see, e.g., FIGS. 15A-15C). Accordingly, if a single gripper in the group fails, the other grippers may continue to operate.

Such a system may also be used for selective gripping (e.g., actuating one or more grippers in an array without actuating all the grippers in an array). For example, a robotic picking system in a warehouse may approach a bin containing a product, and may selectively engage grippers to pick up one, two, three, or any number of items in the bin. The robotic system may then deposit the gripped items in a delivery tote, for distribution to a point of sale. Such a system allows distributors to perform regular (e.g., daily) replenishing of the stock for a point of sale (e.g., an individual store) by providing only precisely the items needed at the time.

It should be noted that although the interlocking tiles shown here only allow for the one dimensional and two dimensional arrangement of grippers, other configurations of pegs and receptacles (or alternative mechanical interlocking features) allow for the assembly of three dimensional arrays of grippers.

It should also be noted that although FIGS. 8A-8E depict modular tiles containing whole grippers, in other embodiments each tile (or some combination of tiles) may only contain a single actuator. In this case, a series of actuators may be oriented relative to one another by interlocking their respective tiles. The resulting arrangement of actuators may form a gripper.

When connecting actuators or grippers together in an array or matrix, there may be a need to ensure that the grippers are mechanically connected to each other in a manner sufficient to resist forces pulling the actuators apart and shear forces pushing on the actuators in a direction perpendicular to their interconnect features. The dovetail arrangement of FIGS. 8A-8E provides such a connection. FIGS. 9A-9D depict further examples of actuated mechanical connections between gripper arrays that may resist pulling and shear forces.

Figure 9A:
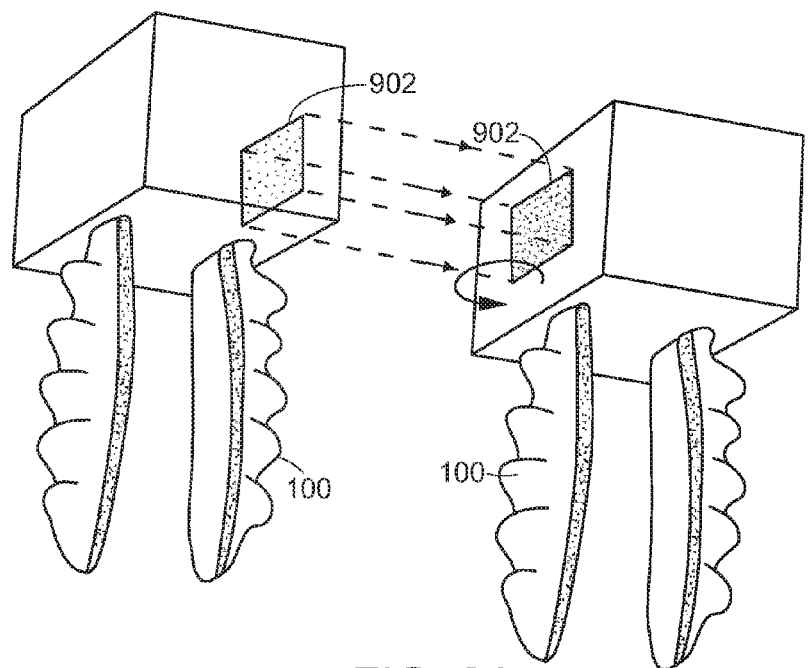
FIGS. 9A-9D depicts examples of actuated mechanical connections between gripper arrays according to exemplary embodiments.

FIG. 9A demonstrates the ability for grippers made up of actuators 100 to connect with each other through actuated mechanisms. Not only does this serve as a connection between grippers, but also allows for reconfiguration. The shaded area 902 is an abstraction of where such actuated connections can be made (although the present invention is not limited to providing actuated connections in this specific area).

Figure 9B:
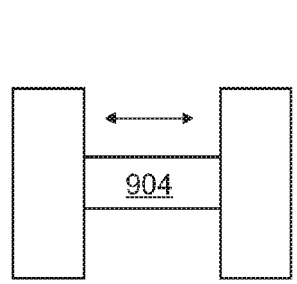

For example, the shaded area 902 may represent a pneumatic linear actuator connection, as shown in FIG. 9B. In this example, a cylinder 904 may be attached to neighboring grippers, and may be pneumatically actuated to move the neighboring grippers closer together or further apart.

Figure 9C:
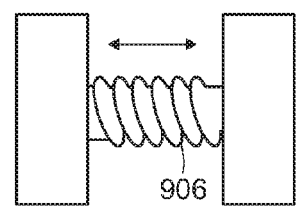
Figure 9D:
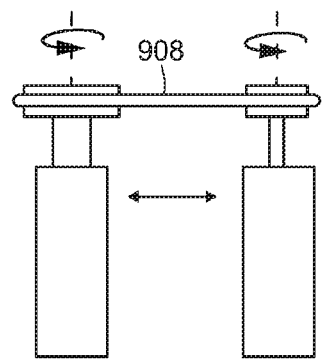

In another example as shown in FIG. 9C, the shaded area 902 may represent a lead-screw-actuated system in which a screw 906 is turned to move neighboring grippers with respect to each other. In yet another example, as shown in FIG. 9D, a belt-driven actuated mechanism 908 may move neighboring grippers with respect to each other.

The connections shown in FIGS. 9A-9D may be used to change configuration by moving two parts relative to one another. In addition, some types of connections (e.g., FIGS. 9B and 9C) may also be used to interlock the grippers, change the distance between grippers, and resist pulling and shear forces.

In addition to mechanical connections, it may also be useful or necessary to electrically or pneumatically interconnect grippers in an array or matrix.

FIGS. 10A-10E depict examples of electrical and pneumatic interconnections. It is noted that the electrical and pneumatic interconnections may also serve as mechanical connections, and may be reinforced for this purpose.

Figure 10A:
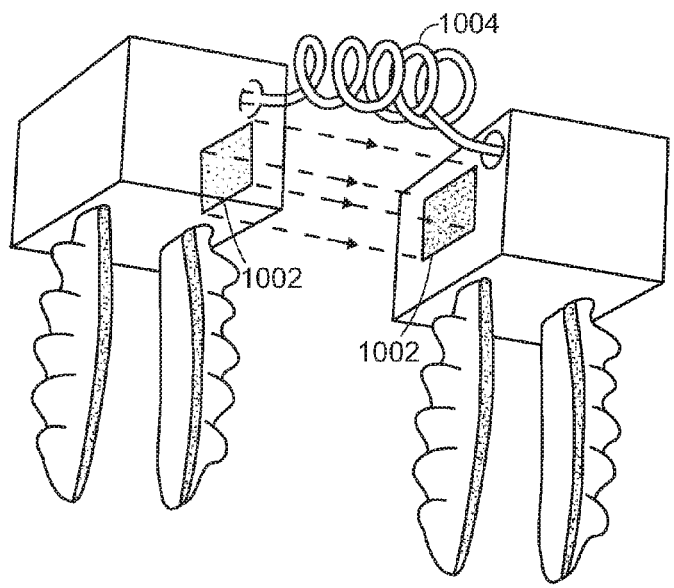
FIGS. 10A-10E depict examples of electrical, mechanical, and pneumatic connections between grippers, according to exemplary embodiments.

FIG. 10A demonstrates the ability for grippers to connect with each other mechanically, electrically and pneumatically. The shaded area 1002 represents a location where such connections can be made. In some embodiments, separate grippers can be connected through a helical cord 1004 through which electrical signals or pressurized air can pass.

Figure 10B:
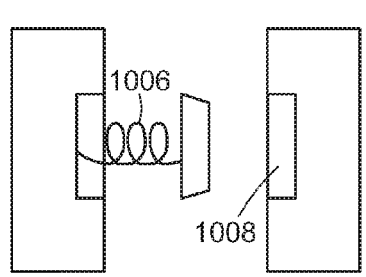
Figure 10C:
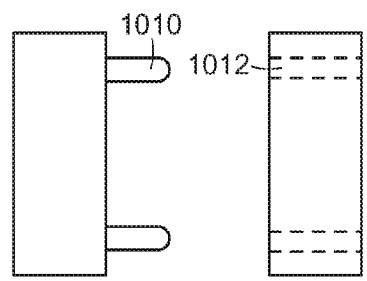
Figure 10D:
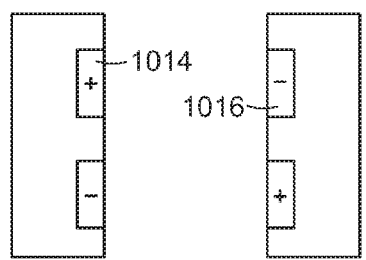
Figure 10E:
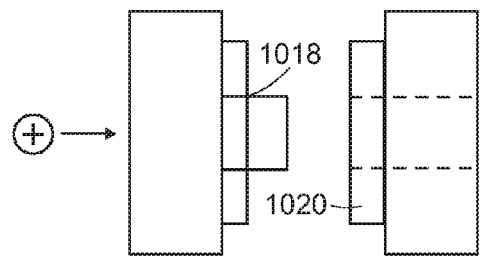

FIGS. 10B, 10C, 10D, and 10E provide several examples to illustrate how these connections can be made. FIG. 10B depicts a spring loaded conductive pad 1006 for electrical connections. The pad 1006 makes contact with, and establishes an electrical connection with, a receiving pad 1008 on a neighboring gripper. FIG. 10C depicts a pinned electrical connection in which a pin 1010 on one gripper mates with a receptacle 1012 on another gripper and establishes an electrical connection. FIG. 10D depicts a magnetic connection between grippers in which a magnet 1014 on one gripper mates with a corresponding (e.g., having opposite polarity) magnet 1016 on a neighboring gripper. FIG. 10E depicts a push-to-connect style connection for a pneumatic line that drives the actuated fingers. In this example, a male pneumatic port 1018 on one gripper mates with a female pneumatic port 1020 on a second gripper to form a connection. This connection may normally be in a closed configuration (e.g., through the use of a valve), so that the final gripper in a chain does not leak pressurized air.

It is noted that the electrical connections may be used to send communications signals between the grippers. Thus, the array of actuators is provided with a type of communications bus, allowing the actuators to communicate with each other (for example, for purposes of positioning, repair or maintenance, sensing, or providing other capabilities). Accordingly, only a single set of wires needs to connect to the communications bus from a central processor, allowing the processor to operate the entire array or matrix of actuators without the need to run wires to each actuator individually.

Actuator Profile Modification, Reinforcement, and Grip Modification

FIGS. 11A-14B depict modular components for modifying aspects of individual actuators, including the actuator bending profile, rigidity, wobble characteristics, and grip characteristics.

Figure 11A:
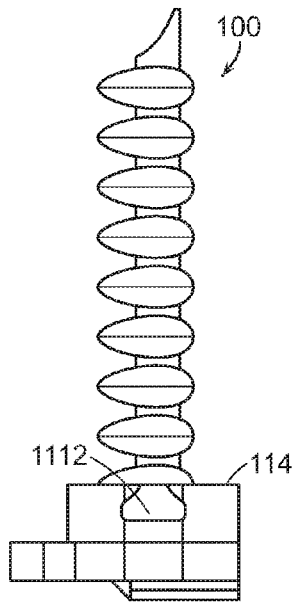
FIGS. 11A-11D depict examples of reconfigurable collar components for adjusting a length of an actuator used for gripping according to an exemplary embodiment.
Figure 11B:
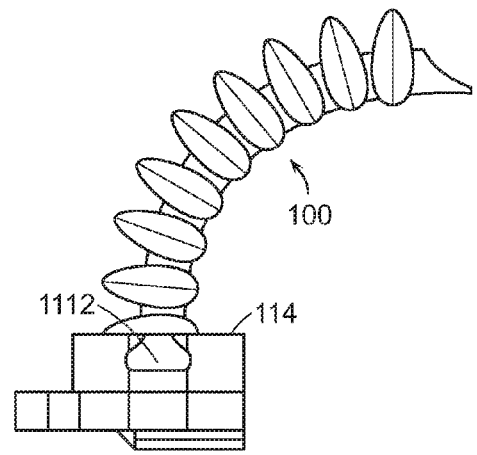

External reinforcements can be used to modify the length of an actuator utilized for gripping, as shown in FIGS. 11A-11D. FIG. 11A depicts an actuator 100 in its unpressurized "neutral" state and FIG. 11B shows the same actuator 100 in its pressurized "actuated" state. The interface 114 of each actuator 100 may be provided with a receptacle 1112, such as a dovetail cutout, to allow the interface 114 to receive reinforcing collars.

Figure 11C:
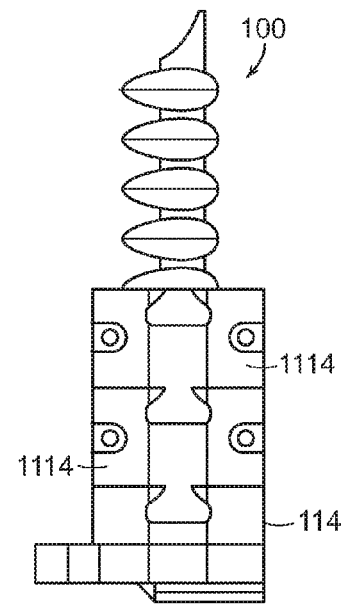
Figure 11D:
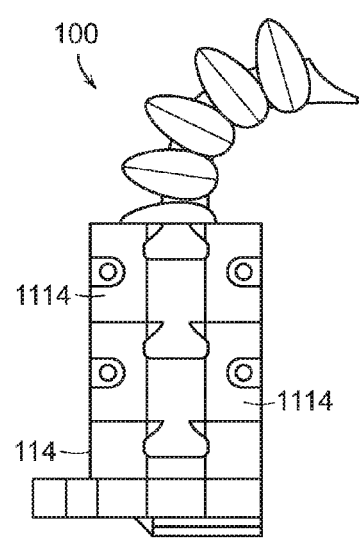

For instance, FIG. 11C depicts the actuator assembly of FIG. 11A, with the addition of two dovetail interlocking modular reinforcing collars 1114 that together envelop half the finger. In FIG. 11C, the actuator is shown in its "neutral" state. FIG. 11D depicts the same actuator in its "actuated" state. It can be seen that by adding the modular reenforcing collars 1114, a smaller portion of the actuator 100 is available to perform gripping operations. This shortening of the actuator 100 can be helpful when reconfiguring a gripper for manipulating smaller parts then what is commonly grasped using the whole actuator 100. In this figure two modular collars 1114 are used, but in general one or more collars can be used depending on the length of actuator 100 needed for the gripping task. These collars 1114 may be designed to snap into one another (e.g., using appropriately shaped mating receptacles and protrusions) to allow for rapid assembly of different lengths of actuator reinforcement.

It is noted that any of a number of other methods may be used to rapidly modify an actuators accessible length. For example, one could abut part of the actuator's strain limiting surface with a hard plate.

In addition, exemplary embodiments may also be used to tune the curvature of an actuator by placing an elastomer tube over a portion of the length of the actuator. In this case, the entire length of the actuator would remain available for use; however, by covering part of the actuator with additional extensible material, the curvature of the actuator may be modified upon pressurization. This would enable the rapid modification of a gripper to manipulate objects of a new shape that is difficult to manipulate using unsheathed actuators.

Figure 12B:
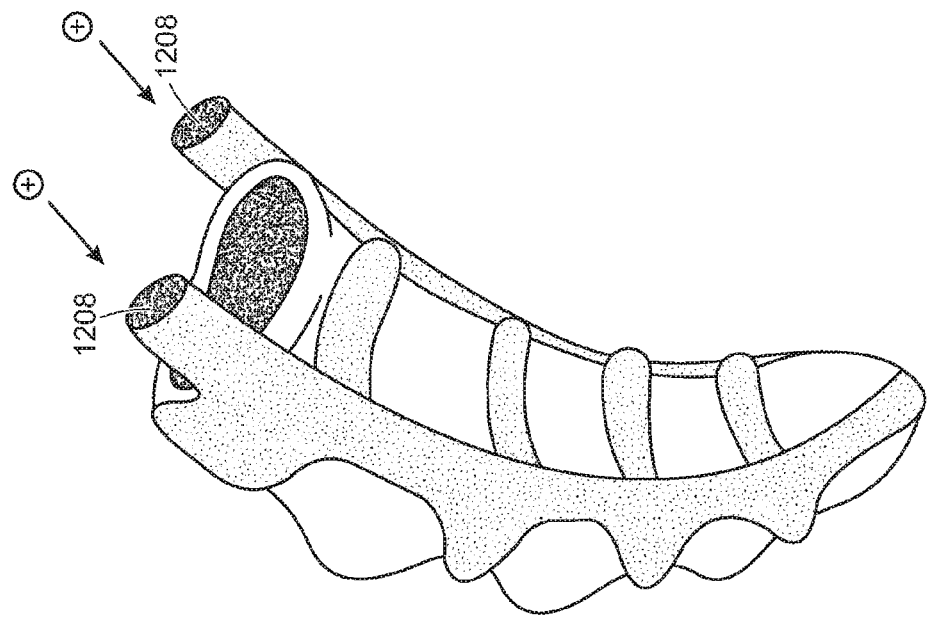
FIGS. 12A-12B depict an exemplary rigidizing adapter suitable for use with exemplary embodiments.
Figure 12A:
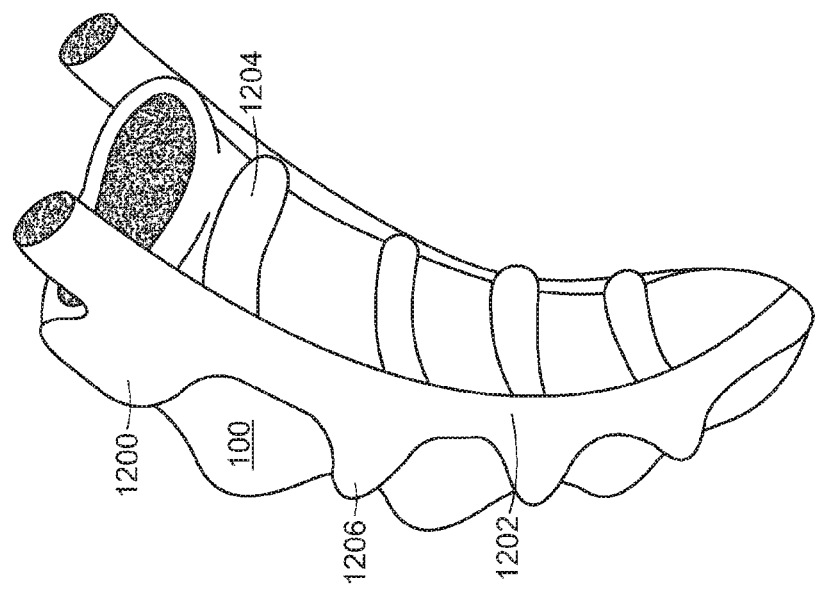

FIGS. 12A-12B illustrate an elastomeric/compliant hollow adapter 1200 that conforms to an actuator 100. The adapter 1200 substantially surrounds the actuator 100 and includes a pair of opposing length members 1202 that extend a length of the actuator 100. The adapter 1200 further includes a plurality of accordion surface members 1204 that extend along a non-gripping surface of the actuator 100, between the accordion extensions of the actuator 100. The adapter 1200 may also include a plurality of gripping surface members 1206 that extend along the gripping surface of the actuator 100.

The adapter 1200 may pressurized through supply ports 1208 with liquid or gas to increase force application or to rigidize the actuator 100 as it grips an object. Rigidizing the actuator 100 mid-operation during fast movements also serves to dampen oscillations of the finger.

FIGS. 13A-13K depict adaptable reinforcements for object gripping and oscillation reduction.

FIGS. 13A-13D show that, during rapid movements, the actuators of a gripper can act as a springed connection between an object being gripped and a gripper. FIG. 13A a gripper including a base 1300 and an actuator 100 immediately after gripping an object 1302, while the gripper remains stationary. In FIG. 13B, the gripper is accelerated by moving the base 1300 to the right in the diagram. This causes the actuators 100 to deflect to the left of the diagram due to inertia. In FIG. 13C, as the gripper attains its target velocity, the actuators 100 swing back towards the center of the base 1300, and as the gripper decelerates (FIG. 13D), the actuators 100 deflect to the right of the image. Upon stopping, the actuators 100 may swing back and forth about a center point. Consequently, during rapid pick and place operations, the object 1302 can experience high frequency oscillations.

FIGS. 13E-13I demonstrate techniques for preventing or reducing these high frequency oscillations. These techniques involve encapsulating a back side (i.e., the non-gripping side including the accordion extensions) of the actuators 100 with a reinforcing material, such as metal or plastic. The reinforcing material may take the form of rails of various configurations that are deployable to approach the sides and/or back of the actuator(s) after an object has been grasped or while the gripper is moving from one location to another. The rails may be actuated in a number of ways, such as through a rack-and-pinon system or pneumatically.

Figure 13E:
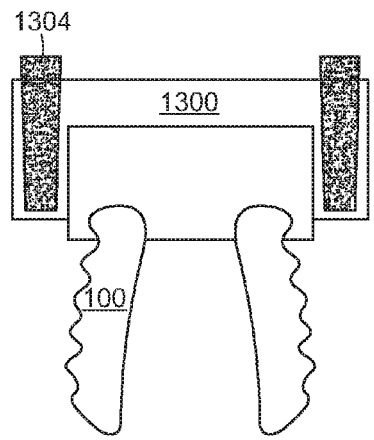
Figure 13F:
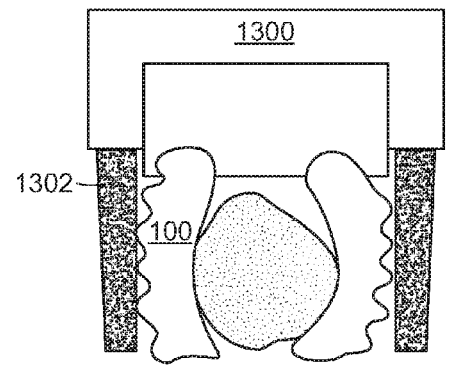

For instance, FIGS. 13E-13F depict a system in which a pair of rails 1304 are housed in slots in the base 1300 of the gripper exterior to the actuators 100. In an undeployed configuration (FIG. 13E), the rails 1304 may be partially or entirely retracted into the housing 1300. When retracted, the rails 1304 may be in a configuration such that they do not obstruct the actuators 100, thereby allowing the actuators to exhibit a full range of motion in order to grasp objects. When deployed (FIG. 13F), the rails 1304 may extend so as to oppose the actuators 100 at least in a direction of motion of the gripper system when the base 1300 is moved. The rails 1304 may encompass additional portions of the actuators 100, up to and including fully surrounding the actuators 100.

The length of the exposed rails can also be manipulated in order to change the grip characteristics of the actuators. For example, fully deploying the rails (as shown in FIG. 13F) may rigidize the entire actuator, whereas partially deploying the rails may change the bending profile of the actuator, as discussed above with respect to FIGS. 11A-11D.

The encapsulating materials may be padded with dampening materials, such as a memory foam, on the surface that contacts the actuator 100. The damping materials may be selected to damp the above-described oscillations.

Figure 13G:
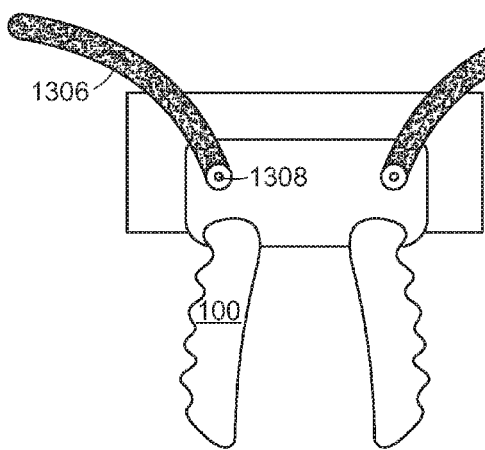
Figure 13H:
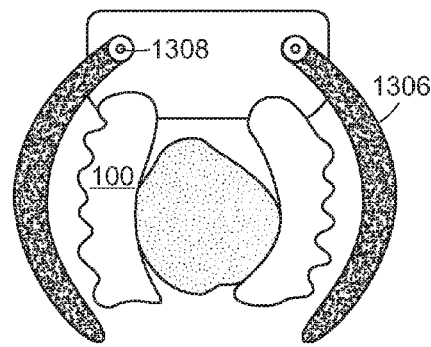
Figure 13I:
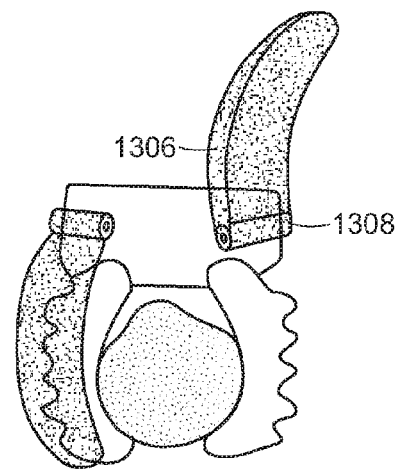

FIGS. 13G-13H depict a similar concept as 13E-13F, but with plates 1306 mounted on hinges 1308 that may be actuated, e.g., through a motorized connection. The plates 1306 may conform to the backs of the actuators 100, such as by having a curve conforming to an expected curvature of the actuators 100 when the actuators 100 grip an object. FIG. 13I provides a perspective view of the plates 1306 of FIGS. 13G-13H.

Figure 13J:
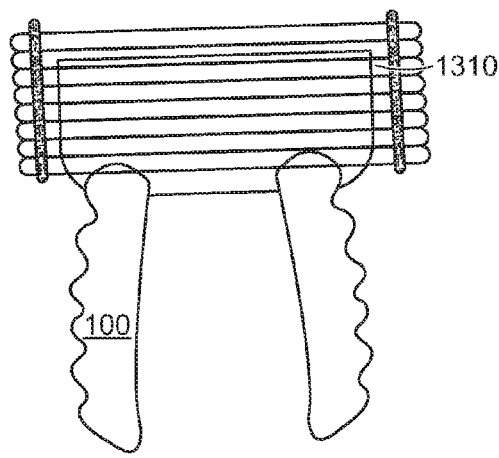
Figure 13K:
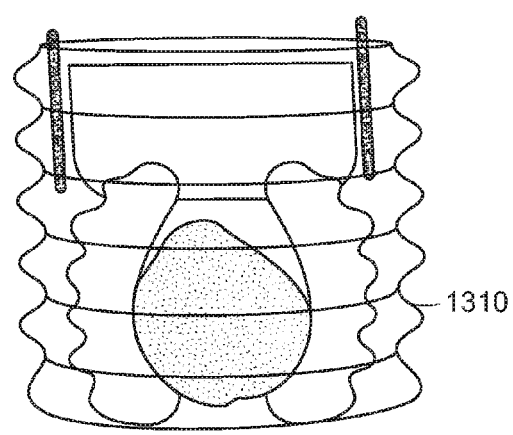

FIGS. 13J-13K depict an accordion-like construct 1310 that can extend to drape over the actuators 100 and gripped object, potentially fully encompassing the gripper system. FIG. 13J depicts the construct 1310 in an undeployed configuration, whereas FIG. 13K depicts the construct 1310 in a deployed configuration.

Figure 14A:
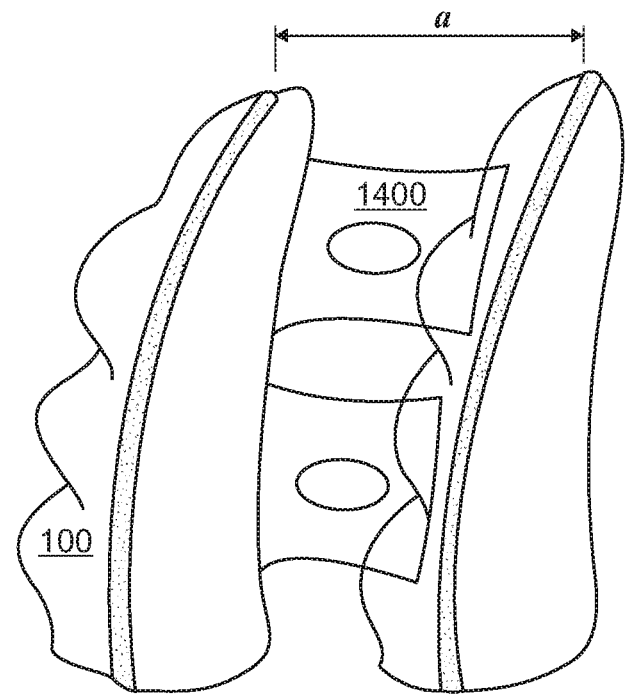
FIGS. 14A-14B depict examples of finger webbing suitable for use with exemplary embodiments.
Figure 14B:
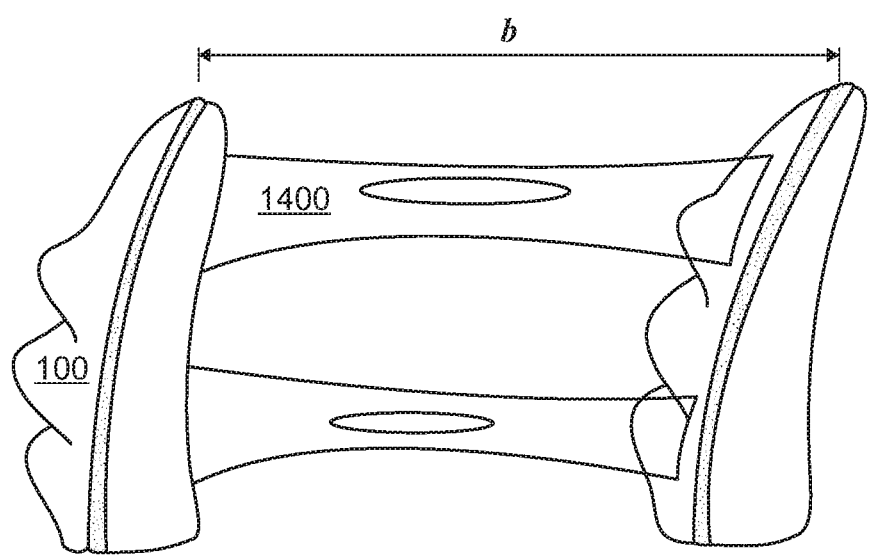

FIGS. 14A-14B depict an elastomeric material 1400 in a web shape that extends between, and joins, nearby actuators. The elastomeric material 1400 may be used to change the effective gripping area of a system of actuators 100. For example, a gripper may be reconfigured from a configuration suited to grabbing a small object, such as an apple (FIG. 14A), to a configuration suited to grabbing a larger object, such as a watermelon (FIG. 14B), dynamically. In order to reconfigure the gripper, the actuators 100 may be repositioned (e.g., using a system such as the one depicted in FIGS. 2A-2C) in order to stretch the elastomeric material 1400. An object gripped between the actuators 100 may press against the elastomeric material 1400, which provides additional gripping surface and friction on the object. This webbing can also help prevent objects from being dropped by slipping between the fingers.

Dynamic Actuator Replacement

An actuator failure may be an abrupt phenomenon involving a feedback situation in which the material of the actuator (e.g., rubber) weakens, allowing more fluid into the actuator. The corresponding increase in pressure further weakens the actuator, resulting in a feedback loop that ends in the failure of the actuator. This pattern can be detected by a flow sensor, which may close the shut-off valve in response to detecting a predetermined pattern corresponding to this phenomenon.

The sensor need not be a flow sensor; for example, it may be a pressure sensor or series of pressure sensors that measure the pressure drop that results from an actuator bursting. Alternatively, it may be a thermal sensor that measures a change in cooling that would result from anomalous air flow arising from the bursting of an actuator. It may also be a piezoelectric sensor attached to a cantilever that measures the air currents that results from the anomalous air flow that would arise from the bursting of an actuator.

For example, FIGS. 15A-15C depict a system for detecting and addressing a problem with an individual actuator 100. A control unit 1500 (FIG. 15A) may include a flow sensor and shut-off valve. The shut-off valve may be a mechanical valve, such as a ball valve. It may also be, for example, a solenoid or other suitable mechanism for shutting of the flow of fluid to the actuator.

Upon actuation of the actuator 100 (e.g., by adding an inflation fluid to the actuator 100, as shown in FIG. 15B), the flow sensor may detect extra air flow caused due to a leak in the actuator 100. When this state is detected (FIG. 15C), the shut-off valve may close a supply line 1502 supplying inflation fluid to the actuator 100. Such a configuration may be useful when one or more actuators 100 in an array of actuators fails. In this way, the failed actuator 100 in the array may be disconnected without compromising all the other actuators.

It is noted that the flow sensor can also be useful for measuring the wear-and-tear of each individual actuator. When an actuator is close to an end of its life cycle, more air is able to fill the space as the elastomer has strained. Using a flow sensor, this extra volume of air may be detected and actuator failure can be predicted.

Actuator failure can be measured and predicted in other ways as well. For example, if the pressure of the inflation fluid into an actuator is regulated (e.g., a pressure sensor is used to keep the pressure of the actuator at 4 p.s.i.), then as the walls of the actuator weaken or fail it may require a higher quantity of fluid flow in order to reach the desired pressure. Similarly, in a metered volumetric flow, the pressure may drop as the walls weaken (given the same amount of flow). These techniques may be used to predict imminent actuator failure. Moreover, given enough data, a pressure profile or flow profile may be used to predict a remaining lifespan of the actuator, which may allow for efficiencies in management of a warehouse or manufacturing line. If an actuator fails while the line is running, then the entire line may need to be shut down for a period of time while the actuator is replaced (resulting in considerable expense). In some cases, an indication of imminent actuator failure may cause the line to be shut down temporarily before failure, in order to exchange the actuator before a failure causes a potential cascade of problems. However, if an imminent failure is detected but the pressure or inflation profile suggests that the actuator will survive until the line is scheduled to be shut down for maintenance (e.g., the probability of actuator failure before the maintenance time is below a predetermined threshold value), then an immediate shutdown may be averted and the actuator may await replacement until the next scheduled maintenance shut down.

Similarly, failures can be detected by the presence of an anomalous flow signal or pressure signal. For example, if a pressure regulation system provides sufficient inflation fluid to inflate an actuator to a predetermined pressure, but a sensor at the actuator detects a smaller pressure, this may indicate the presence of a leak in the actuator. Similarly, a leak may be detected if fluid flow is required within a predetermined time of actuator inflation. For example, if an actuator is inflated to 4 p.s.i., but a flow of inflation fluid is required to maintain 4 p.s.i. within a certain time after inflation (e.g., two seconds), this may indicate the presence of a leak.

Figure 16A:
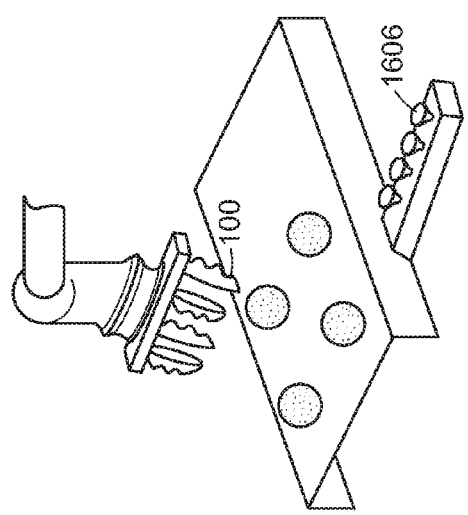
FIGS. 16A-16D depict an example of a system for rapidly and dynamically changing an actuator, according to exemplary embodiments.
Figure 16D:
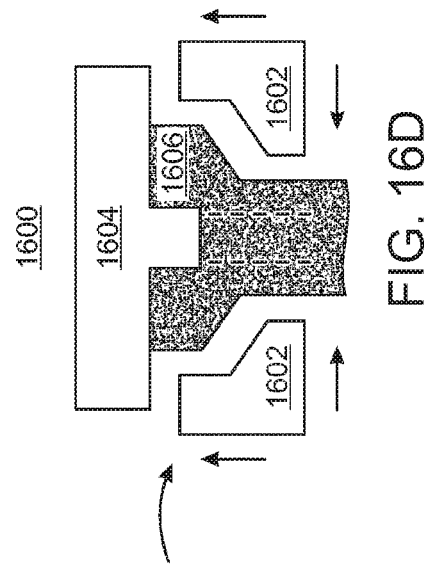

Once a problem is detected with an actuator, it may be helpful to be able to quickly and dynamically replace the actuator with another. Alternatively, there may be a need to rapidly change between actuators of different size or types. For these and other purposes, a quick-changer may be employed. One example of an exemplary quick-changer 1600 is depicted in FIGS. 16A-16D. FIG. 16A depicts a perspective view of a robotic arm system including a quick-change mechanism, and FIG. 16B is a close-up of the gripper of the robotic arm system, including four actuators 100.

Figure 16C:
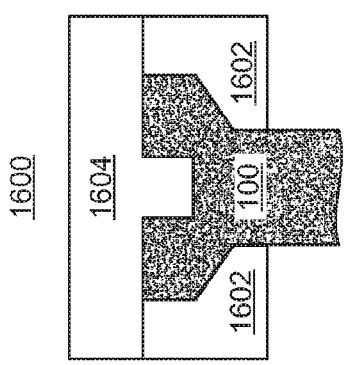
Figure 16B:
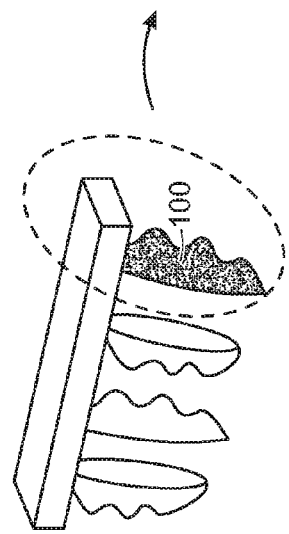

The quick-changer 1600 includes mating surfaces 1602 shaped and configured to mate with the actuator 100, which allows the mating surfaces 1602 to conform to the actuator 100 and create a seal (FIG. 16C). When it is time to change the actuator 100, the surfaces 1602 may be separated (e.g., by a motor or other device) to release the actuator 100. The base 1604 of the quick-changer 1600 may be maneuvered over a new actuator 1606, which may be identified using visual detection means, by scanning a bar code, QR code, or RFID code on the gripper, etc. The base may maneuver into position above the new actuator 100, and the surfaces may be closed around the actuator 100 to effect a new seal and secure the actuator 100 in place (FIG. 16D). Each actuator 100 may include its own sealing mechanism having customized mating surfaces 1602, or a general-purpose sealing mechanism may be provided on the gripper base.

The invention claimed is:

1. A modular robotic system comprising:
a soft actuator comprising an elastomeric bladder configured to receive an inflation fluid; and
a substrate comprising a periodic hole array, the holes of the periodic hole array providing respective paths for supplying the inflation fluid to the soft actuator, wherein the soft actuator is releasably mounted over a first hole of the periodic hole array and deployed on the substrate using annular overmolded magnets deployed in a flange of the soft actuator and having a through-hole through which a pneumatic fluid passes to actuate the soft actuator.

2. A modular robotic system comprising:
a first soft actuator comprising an elastomeric bladder configured to receive an inflation fluid;
a quick-change assembly for replacing the first soft actuator with a different type or size of actuator, the quick-change assembly comprising two or more mating surfaces that correspond to a shape of the first soft actuator and mate to form a seal around the first soft actuator; and
a shut-off valve for cutting off a flow of the inflation fluid to the first soft actuator.

3. The modular robotic system of claim 2, further comprising:
a positioning system configured to dynamically adjust an absolute position of the first soft actuator in a Cartesian plane or a position of the first soft actuator relative to a second actuator in the Cartesian plane.

4. The modular robotic system of claim 3, wherein the first soft actuator is deployed on a rail having a T-extrusion, and the positioning system moves the first soft actuator on the rail to change a distance between the first soft actuator and the second actuator.

5. The modular robotic system of claim 3, wherein the first soft actuator is deployed among a plurality of actuators in a first configuration representing a first array or matrix, and the positioning system is configured to redeploy the plurality of actuators into a second configuration representing a second array or matrix, the second configuration differing from the first configuration.

6. The modular robotic system of claim 3, wherein the positioning system further comprises a rotation mechanism for rotating the first soft actuator about its base.

7. The modular robotic system of claim 3, wherein the positioning system dynamically adjusts a position of the first soft actuator in three dimensions.

8. The modular robotic system of claim 2, further comprising:
a first substrate mounted to the first soft actuator, the first substrate comprising a base configured to interlock with a second substrate mounting a second soft actuator, and a path for supplying the inflation fluid to the first soft actuator.

9. The modular robotic system of claim 8, wherein first substrate is interconnected with the second substrate using a mechanical connection that is configured to resist a shear force in a direction perpendicular to the direction of interconnection.

10. The modular robotic system of claim 8, wherein the first substrate comprises one or more pneumatic or electrical interconnects for distributing a pneumatic fluid or electrical charge to the soft actuator.

11. The modular robotic system of claim 2, wherein the shut-off valve cuts off the flow of the inflation fluid when a pattern corresponding to an imminent failure of the first soft actuator is detected.

* * * * *